UNITED STATES PATENT OFFICE.

JAMES NICHOLAS, OF WATERLOO, ENGLAND.

TREATMENT OF ORES AND THE LIKE.

No. 805,577.

Specification of Letters Patent.

Patented Nov. 28, 1905.

Application filed May 27, 1905. Serial No. 262,556.

*To all whom it may concern:*

Be it known that I, JAMES NICHOLAS, manufacturing chemist, a subject of the King of Great Britain, residing at 14 Church road, Waterloo, county of Lancaster, England, have invented certain new and useful Improvements in the Treatment of Ores and the Like, of which the following is a specification.

This invention relates to improvements in the treatment of ores, mattes, scorial slimes, slags, tailings, and all like material containing zinc, whether alone or in association with cadmium, lead, silver, or gold, the object being to recover the metallic contents of the ore or other material treated by this invention in a more expeditious, a more economic, and in a more complete manner than has hitherto been found practicable and to recover the metal or metals contained in such ores or other material separate and practically pure.

The invention consists in exposing in pulverulent condition the ore mixed with water to a pasty condition and with a chlorid, preferably sodium chlorid, in an oven, muffle, or the like to the action of heat, whereby the constituents of the ore are broken up, the zinc or zinc and cadmium compounds being thus converted into chlorids. Air must be excluded during this operation. The quantity of chlorid should be somewhat more than the theoretical amount required, and the heating is continued until the whole of the zinc or zinc and cadmium in the ore or material is converted into the chlorid condition. After such chloridization has been effected the mass in the oven is drawn out and leached with water to dissolve out the zinc chlorid and the cadmium chlorid contained in it. If the solution so obtained contains zinc chlorid only, then the zinc may be precipitated by milk of lime as zinc oxid. Should the solution contain cadmium as well as zinc, then the cadmium may be obtained from it by being precipitated as sulfid by sulfureted hydrogen prior to the precipitation of the zinc oxid, as previously alluded to. The zinc oxid and the cadmium sulfid may be reduced to metallic condition by any well-known method. Should the residue of the leached mass contain lead or lead and silver or lead and silver and gold, this residue is mixed with flux or fluxes to suit its gangue and fluxed in a furnace. Should the metal so obtained contain silver or gold, or both, then the metal is remelted, and when in a molten condition aluminium is introduced into it and the whole kept in agitation and the heat raised until the aluminium melts and becomes alloyed with any precious metal or metals which may have been contained in the lead. When this has been accomplished, agitation is stopped and the temperature is allowed to fall, when the aluminium will separate from and rise as a crust to the surface of the lead, carrying with it in association any precious metal or metals which were present in the metal or lead fluxed out of the residue. The quantity of aluminium to be added will vary according to the weight of the precious metal contained in the lead. It is used in excess of their relative atomic weights. The lead may now be run into pig and the aluminium crust which has been skimmed off broken up by hydrochloric acid and the precious metal or metals it had abstracted recovered in a form easy of reduction to metallic condition.

What I claim is—

1. The treatment of materials containing zinc, by mixing the pulverized materials with water, and with a chlorid, and then heating the mixture with the exclusion of air.

2. The treatment of materials containing zinc, by mixing the pulverized materials with water, and with a chlorid, and then heating the mixture with the exclusion of air, leaching this so-treated mixture with water, and treating the solution obtained to recover zinc.

3. The treatment of materials containing zinc, by mixing the pulverized materials with water, and with a chlorid, and then heating the mixture, leaching this so-treated mixture with water, and reducing the metallic compounds contained in the leached residue to a metallic state.

4. The treatment of materials containing zinc, lead and precious metal, by mixing the pulverized materials with water, and with a chlorid, and then heating the mixture, leaching this so-treated mixture with water, reducing the metallic compounds contained in the leached residue to a metallic state, heating the lead and precious metal with aluminium, and separating the alloy of precious metal with aluminium from the lead.

5. The treatment of materials containing zinc, lead and precious metal, by mixing the pulverized materials with water, and with a chlorid, and then heating the mixture, leaching this so-treated mixture with water, reducing the metallic compounds contained in the leached residue to a metallic state, agitating the molten lead and precious metal with aluminium, cooling, then separating the alloy of precious metal with aluminium from the lead.

JAMES NICHOLAS.

Witnesses:
P. L. JACKSON,
ALFRED H. ABSALOM.